US009111691B2

(12) United States Patent
Hamada

(10) Patent No.: US 9,111,691 B2
(45) Date of Patent: Aug. 18, 2015

(54) CERAMIC ELECTRONIC COMPONENT

(71) Applicant: Murata Manufacturing Co., Ltd., Nagaokakyo-shi, Kyoto-fu (JP)

(72) Inventor: Kunihiko Hamada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/865,230

(22) Filed: Apr. 18, 2013

(65) Prior Publication Data

US 2013/0279070 A1    Oct. 24, 2013

(30) Foreign Application Priority Data

Apr. 24, 2012  (JP) ................................. 2012-098965

(51) Int. Cl.
  *H01G 4/005*  (2006.01)
  *H01G 4/30*  (2006.01)
  *H01G 4/012*  (2006.01)
  *H01G 4/232*  (2006.01)

(52) U.S. Cl.
  CPC ................. *H01G 4/30* (2013.01); *H01G 4/012* (2013.01); *H01G 4/232* (2013.01); *H01G 4/2325* (2013.01)

(58) Field of Classification Search
  CPC .......... H01G 4/005; H01G 4/012; H01G 4/30
  USPC ....................................................... 361/303
  See application file for complete search history.

(56) References Cited

U.S. PATENT DOCUMENTS

| 4,584,628 | A | * | 4/1986 | Cichanowski | ................. 361/309 |
| 5,414,588 | A | * | 5/1995 | Barbee et al. | ................. 361/304 |
| 7,324,324 | B2 | * | 1/2008 | Sugimoto et al. | ............. 361/303 |
| 7,329,976 | B2 | * | 2/2008 | Shirasu et al. | ................. 310/366 |
| 7,430,105 | B2 | * | 9/2008 | Okuyama | ..................... 361/303 |
| 7,821,770 | B2 | * | 10/2010 | Nishikawa et al. | ........ 361/321.2 |
| 8,305,729 | B2 | * | 11/2012 | Ito et al. | ........................ 361/303 |
| 2001/0006449 | A1 | * | 7/2001 | Chazono | .................... 361/306.3 |
| 2006/0245141 | A1 | | 11/2006 | Shirasu et al. | |
| 2010/0008017 | A1 | * | 1/2010 | Ito et al. | ..................... 361/301.4 |

(Continued)

FOREIGN PATENT DOCUMENTS

JP    09232179 A    *    9/1997
JP    2004-228468 A        8/2004

(Continued)

OTHER PUBLICATIONS

Official Communication issued in corresponding Japanese Patent Application No. 2012-098965, mailed on Apr. 8, 2014.

*Primary Examiner* — Eric Thomas
(74) *Attorney, Agent, or Firm* — Keating & Bennett, LLP

(57) ABSTRACT

A ceramic electronic component includes a first internal electrode that includes a first opposed section and a first extraction section. The first opposed section is opposed to a second internal electrode with a ceramic layer interposed therebetween. The first extraction section is located closer to a first end surface than the first opposed section. The first extraction section includes a first thick section. The first thick section is thicker than a first central section of the first opposed section. The first opposed section includes a first base end section opposed to a second tip section of the second internal electrode closer to the first end surface, with the ceramic layer interposed therebetween, and the first base end section includes a first thin section. The first thin section is thinner than the first central section.

17 Claims, 2 Drawing Sheets

(56) References Cited

U.S. PATENT DOCUMENTS

2010/0085682 A1* 4/2010 Abe et al. .................. 361/303
2012/0151763 A1* 6/2012 Jung et al. .................. 29/846
2012/0250220 A1* 10/2012 Yamashita et al. ......... 361/321.2

FOREIGN PATENT DOCUMENTS

JP 2006-332601 A 12/2006
WO 2011/071143 A1 6/2011

\* cited by examiner

CERAMIC ELECTRONIC COMPONENT

BACKGROUND OF THE INVENTION

1. Field of the Invention

The present invention relates to a ceramic electronic component.

2. Description of the Related Art

Conventionally, ceramic electronic components, such as ceramic capacitors, have been used for various applications. For example, JP 2006-332601 A discloses, as an example of the components, a laminated ceramic capacitor in which an internal electrode is thicker in an electrode extraction section than in a capacitance generation section. In the laminated ceramic capacitor disclosed in JP 2006-332601 A, the relatively thick electrode extraction section has a partial overlap with the relatively thin capacitance generation section in the length direction.

From the perspective of increasing the performance of ceramic electronic components, it is important to provide internal electrodes with high positional precision. However, in the case of the laminated ceramic capacitor disclosed in JP 2006-332601 A, it is difficult to increase the positional precision for the internal electrodes. Therefore, it is difficult to increase the performance of the laminated ceramic electronic component.

SUMMARY OF THE INVENTION

Preferred embodiments of the present invention provide a ceramic electronic component having improved performance.

A ceramic electronic component according to a preferred embodiment of the present invention includes a ceramic body, a first internal electrode, and a second internal electrode. The ceramic body includes first and second principal surfaces, first and second side surfaces, and first and second end surfaces. The first internal electrode is disposed in the ceramic body. The first internal electrode extends in a direction from the first end surface. The second internal electrode is disposed in the ceramic body so as to be opposed to the first internal electrode with a ceramic layer interposed therebetween. The second internal electrode extends in a direction from the second end surface. The first internal electrode includes a first opposed section and a first extraction section. The first opposed section is opposed to the second internal electrode with the ceramic layer interposed therebetween. The first extraction section is not opposed to the second internal electrode with the ceramic layer interposed therebetween. The first extraction section is located closer to the first end surface than the first opposed section. The first extraction section includes a first thick section. The first thick section is thicker than a first central section of the first opposed section. The first opposed section includes a first base end section. The first base end section is opposed to a second tip section of the second internal electrode closer to the first end surface, with the ceramic layer interposed therebetween. The first base end section includes a first thin section. The first thin section is thinner than the first central section.

In a preferred embodiment of the ceramic electronic component according to the present invention, the second internal electrode includes a second opposed section and a second extraction section. The second opposed section is opposed to the first internal electrode with the ceramic layer interposed therebetween. The second extraction section is not opposed to the first internal electrode with the ceramic layer interposed therebetween. The second extraction section is located closer to the second end surface than the second opposed section. The second extraction section includes a second thick section. The second thick section is thicker than a second central section of the second opposed section. The second opposed section includes a second base end section. The second base end section is opposed to a first tip section of the first internal electrode closer to the second end surface, with the ceramic layer interposed therebetween. The second base end section includes a second thin section. The second thin section is thinner than the second central section.

In another preferred embodiment of the ceramic electronic component according to the present invention, the second tip section includes a third thick section. The third thick section is thicker than the second central section.

In another preferred embodiment of the ceramic electronic component according to the present invention, the third thick section and the first thin section are opposed to each other with the ceramic layer interposed therebetween.

In yet another preferred embodiment of the ceramic electronic component according to the present invention, the first tip section includes a fourth thick section. The fourth thick section is thicker than the first central section.

In yet another preferred embodiment of the ceramic electronic component according to the present invention, the fourth thick section and the second thin section are opposed to each other with the ceramic layer interposed therebetween.

In still another preferred embodiment of the ceramic electronic component according to the present invention, the ceramic electronic component further includes a first external electrode and a second external electrode. The first external electrode is provided on the first end surface. The first external electrode is connected to the first internal electrode. The second external electrode is provided on the second end surface. The second external electrode is connected to the second internal electrode.

According to various preferred embodiments of the present invention, the performance of the ceramic electronic component is significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
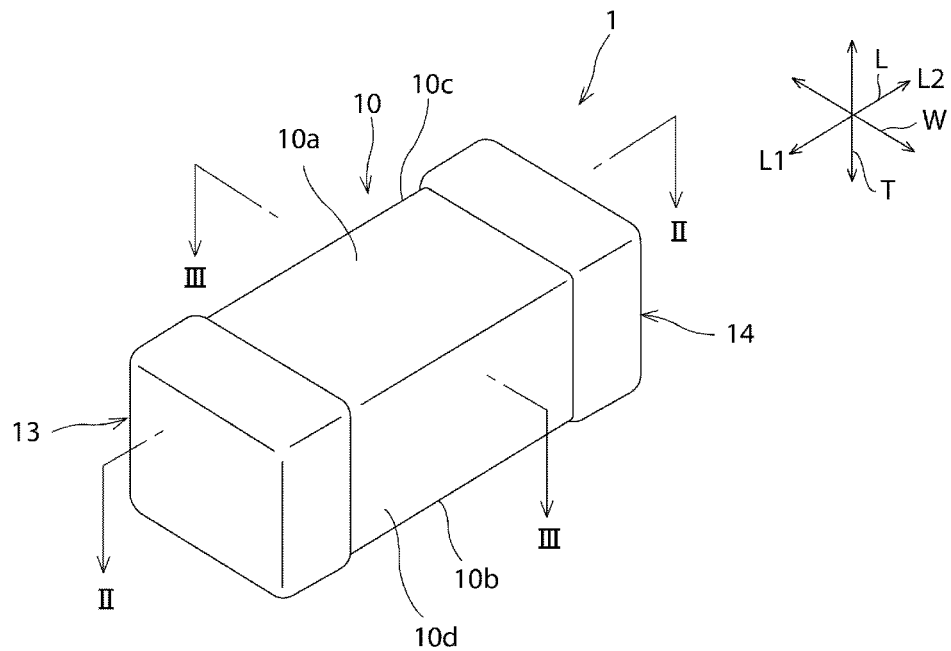
FIG. 1 is a schematic perspective view of a ceramic electronic component according to a preferred embodiment of the present invention.

Non-limiting examples of preferred embodiments of the present invention will be described below. However, the following preferred embodiments are merely described by way of example. The present invention is not limited in any way to the following preferred embodiments.

In addition, in the drawings, members which have substantially the same functions are referenced by the same symbols. In addition, the drawings are schematic illustrations. The dimensional ratios and proportions of the elements shown in the drawings may be different from the dimensional ratios and proportions of the real elements in some cases. The dimensional ratios and proportions of the elements may be also different between the drawings in some cases. The specific dimensional ratios and proportions of the elements should be determined in view of the following description.

Figure 2:
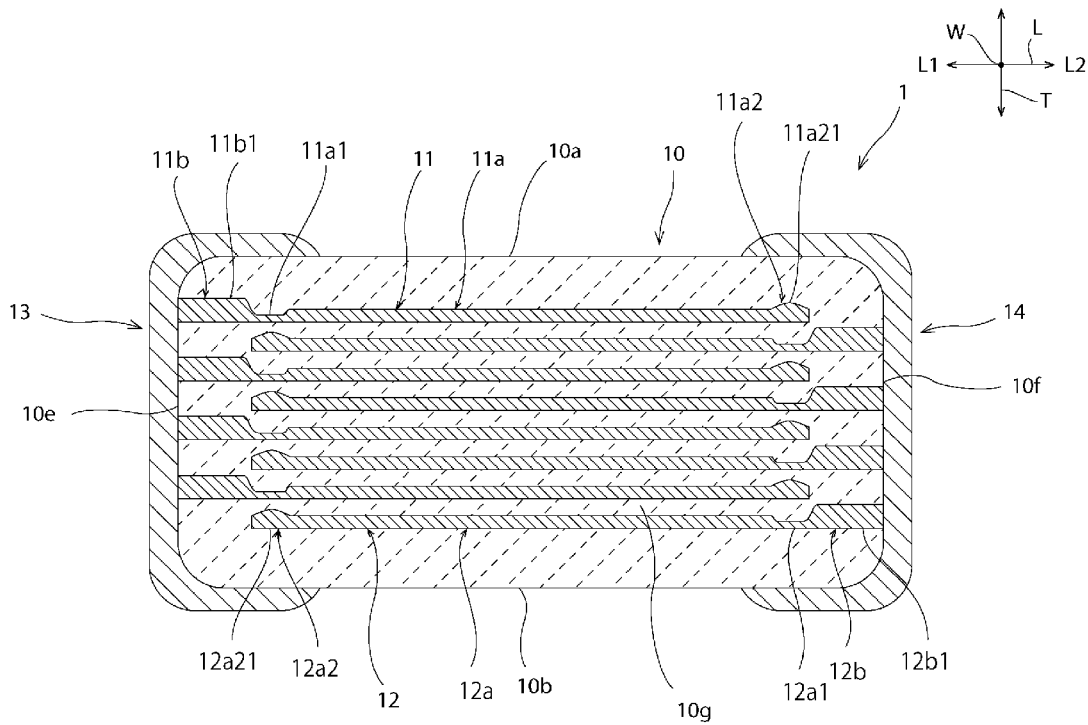
FIG. 2 is a schematic cross-sectional view along line II-II of FIG. 1.
Figure 3:
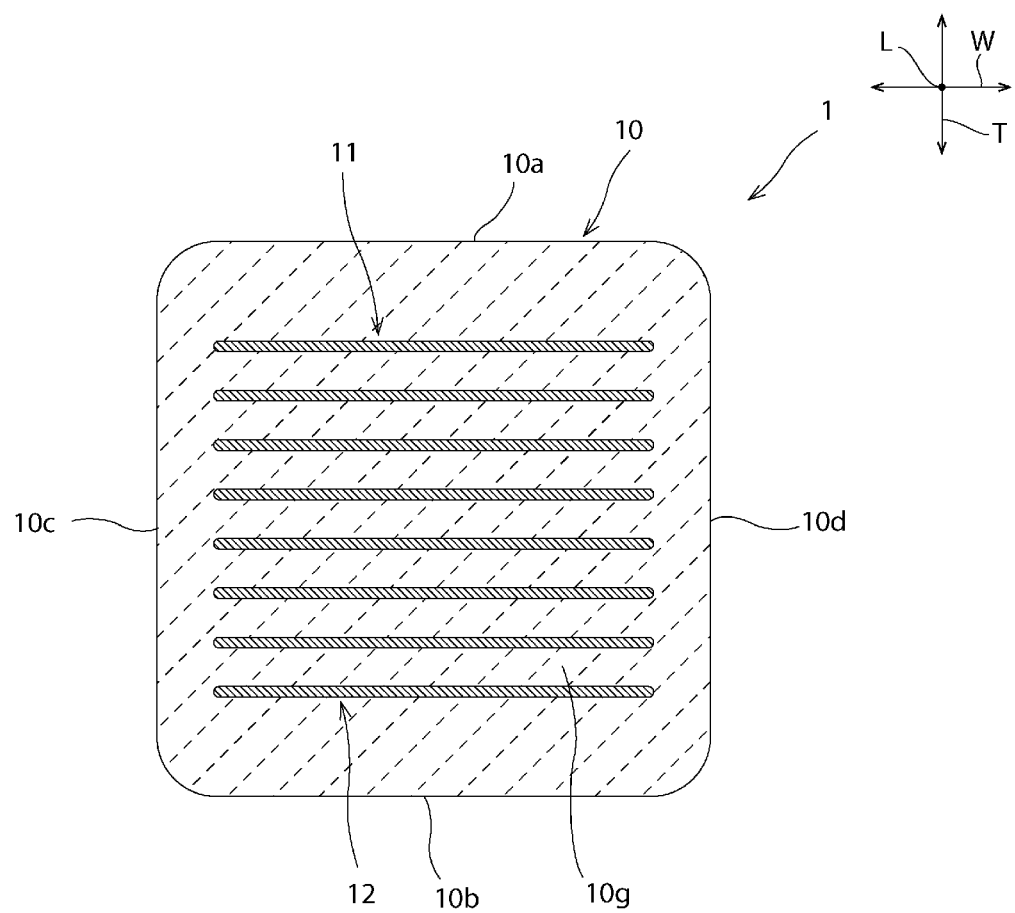
FIG. 3 is a schematic cross-sectional view along line III-III of FIG. 1.

FIG. 1 is a schematic perspective view of a ceramic electronic component 1 according to a preferred embodiment of the present invention. FIG. 2 is a schematic cross-sectional view along line II-II of FIG. 1. FIG. 3 is a schematic cross-sectional view along line III-III of FIG. 1.

The ceramic electronic component 1 includes a ceramic body 10. The ceramic body 10 includes first and second end surfaces 10e and 10f (see FIG. 2) parallel or substantially parallel to each other. Specifically, the ceramic body 10 preferably has a substantially cuboid shape, for example. The ceramic body 10 includes first and second principal surfaces 10a and 10b, first and second side surfaces 10c and 10d, and the first and second end surfaces 10e and 10f. The first and second principal surfaces 10a and 10b respectively extend in a length direction L and a width direction W. The first principal surface 10a and the second principal surface 10b are parallel or substantially parallel to each other. The first and second side surfaces 10c and 10d respectively extend in the length direction L and a thickness direction T. The first side surface 10c and the second side surface 10d are parallel or substantially parallel to each other. The first and second end surfaces 10e and 10f respectively extend in the width direction W and the thickness direction T. The first end surface 10e and the second end surface 10f are parallel or substantially parallel to each other.

It is to be noted that the term "substantially cuboid shape" includes cuboids with corners or ridge lines that are chamfered and cuboids with corners or ridge lines that are rounded.

The ceramic body 10 preferably is made of an appropriate ceramic material. The ceramic material used for the ceramic body 10 is appropriately selected depending on the characteristics and other properties of the ceramic electronic component 1.

For example, when the ceramic electronic component 1 is a ceramic capacitor, the ceramic body 10 can preferably be made of a material including a dielectric ceramic as its main constituent. Specific examples of the dielectric ceramic include, for example, $BaTiO_3$, $CaTiO_3$, $SrTiO_3$, and $CaZrO_3$. In addition, for example, accessory constituents such as a Mn compound, a Co compound, a rare-earth compound, and a Si compound may be appropriately added to the ceramic body 10.

As shown in FIGS. 2 and 3, first and second internal electrodes 11 and 12 are provided in the ceramic body 10. The first and second internal electrodes 11 and 12 are provided respectively in the length direction L and the width direction W. The first and second internal electrodes 11 and 12 are opposed to each other with a ceramic layer 10g interposed therebetween in the thickness direction T. The first internal electrode 11 is extracted and extends to the first end surface 10e. The first internal electrode 11 extends in the length direction L from the first end surface 10e. The first internal electrode 11 does not extend to the second end surface 10f or the first or second side surface 10c or 10d.

The second internal electrode 12 is extracted and extends to the second end surface 10f. The second internal electrode 12 extends in the length direction L from the second end surface 10f. The first internal electrode 12 does not extend to the first end surface 10e or the first or second side surface 10c or 10d. For this reason, each end of the ceramic body 10 in the length direction L has a region in which only one of the first and second internal electrodes 11 and 12 is provided.

The first internal electrode 11 is connected to a first external electrode 13. The first external electrode 13 is provided on the first end surface 10e. In the present preferred embodiment, the first external electrode 13 is preferably provided not only on the first end surface 10e, but also on the first and second principal surfaces 10a and 10b and the first and second side surfaces 10a and 10d.

The second internal electrode 12 is connected to a second external electrode 14. The second external electrode 14 is provided on the second end surface 10f. In the present preferred embodiment, the second external electrode 14 is provided not only on the second end surface 10f, but also on the first and second principal surfaces 10a and 10b and the first and second side surfaces 10a and 10d.

The first and second internal electrodes 11 and 12 and the first and second external electrodes 13 and 14 are each made of an appropriate conductive material. Specifically, the first and second internal electrodes 11 and 12 and the first and second external electrodes 13 and 14 may preferably be made of at least one material such as Ni, Cu, Ag, Pd, Au, Pt, and Sn, for example. The first and second external electrodes 13 and 14 may preferably be made of, for example, a laminated body of more than one conductive layer.

As shown in FIG. 2, the first internal electrode 11 includes a first opposed section 11a and a first extraction section 11b. The first extraction section 11b is located closer to the first end surface 10e (L1 side) than the first opposed section 11a. The first internal electrode 11 is electrically connected to the first external electrode 13 at the first extraction section 11b.

The second internal electrode 12 includes a second opposed section 12a and a second extraction section 12b. The second extraction section 12b is located closer to the second end surface 10f (L2 side) than the second opposed section 12a. The second internal electrode 12 is electrically connected to the second external electrode 14 at the second extraction section 12b.

The first opposed section 11a and the second opposed section 12a are opposed to each other with the ceramic layer 10g interposed therebetween. The first extraction section 11b is located closer to the L1 side than a tip of the second internal electrode 12 on the first end surface 10e side (L1 side). For this reason, the first extraction section 11b is not opposed to the second internal electrode 12. The second extraction section 12b is located closer to the L2 side than a tip of the first internal electrode 11 on the second end surface 10f side (L2 side). For this reason, the second extraction section 12b is not opposed to the first internal electrode 11.

The first extraction section 11b has a first thick section 11b1 that is thicker than a central section (first central section) of the first opposed section 11a in the length direction L. The first extraction section 11b may be entirely defined by the first thick section 11b1, or the first extraction section 11b may be partially defined by the first thick section 11b1. More specifically, what is required is only that the first extraction section 11b is at least partially thicker than the central section of the first opposed section 11a in the length direction L.

The maximum thickness of the first thick section 11b1 is preferably about 1.2 times or more, and more preferably about 1.5 times or more, the thickness of the central section of the first opposed section 11a in the length direction L, for example. However, if the first thick section 11b1 is excessively thick, delamination may occur in some cases. Therefore, the maximum thickness of the first thick section 11b1 is preferably about 2.5 times or less, and more preferably about 2.0 times or less, the thickness of the central section of the first opposed section 11a in the length direction L, for example.

The second extraction section 12b includes a second thick section 12b1 that is thicker than a central section (second central section) of the second opposed section 12a in the length direction L. The second extraction section 12b may be entirely defined by the second thick section 12b1, or the second extraction section 12b may be partially defined by the second thick section 12b1. More specifically, what is required is only that the second extraction section 12b is at least partially thicker than the central section of the second opposed section 12a in the length direction L.

The maximum thickness of the second thick section 12b1 is preferably about 1.2 times or more, and more preferably 1.5 about times or more, the thickness of the central section of the second opposed section 12a in the length direction L. However, if the second thick section 12b1 is excessively thick, delamination may occur in some cases. Therefore, the maximum thickness of the second thick section 12b1 is preferably about 2.5 times or less, and more preferably about 2.0 times or less, the thickness of the central section of the second opposed section 12a in the length direction L.

The first opposed section 11a includes a first opposed thin section 11a1. The first thin section 11a1 is opposed to a second tip section 12a2 of the second internal electrode 12 on the L1 side, with the ceramic layer 10g interposed therebetween. The first thin section 11a1 is thinner than the central section (first central section) of the first opposed section 11a in the length direction L. The minimum thickness of the first thin section 11a1 is preferably about 0.95 times or less, and more preferably about 0.9 times or less, the thickness of the central section of the first opposed section 11a in the length direction L, for example. However, if the first thin section 11a1 is excessively thin, the electrical resistance of the first thin section 11a1 may be increased excessively in some cases. Therefore, the minimum thickness of the first thin section 11a1 is preferably about 0.6 times or more, and more preferably about 0.8 times or more, the thickness of the central section of the first opposed section 11a in the length direction L, for example.

The second opposed section 12a includes a second thin section 12a1. The second thin section 12a1 is opposed to a first tip section 11a2 of the first internal electrode 11 on the L2 side, with the ceramic layer 10g interposed therebetween. The second thin section 12a1 is thinner than the central section (second central section) of the second opposed section 12a in the length direction L. The minimum thickness of the second thin section 12a1 is preferably about 0.95 times or less, and more preferably about 0.9 times or less, the thickness of the central section of the second opposed section 12a in the length direction L, for example. However, if the second thin section 12a1 is excessively thin, the electrical resistance of the second thin section 12a1 may be increased excessively in some cases. Therefore, the minimum thickness of the second thin section 12a1 is preferably about 0.6 times or more, and more preferably about 0.8 times or more, the thickness of the central section of the second opposed section 12a in the length direction L, for example.

The first tip section 11a2 includes a fourth thick section 11a21 that is thicker than the central section (first central section) of the first opposed section 11a in the length direction L. The fourth thick section 11a21 is opposed to the second thin section 12a1 with the ceramic layer 10g interposed therebetween in the thickness direction T. The maximum thickness of the fourth thick section 11a21 is preferably about 1.1 times to about 1.8 times, and preferably about 1.1 times to about 1.4 times, the thickness of the central section of the first opposed section 11a in the length direction L, for example. The maximum thickness of the fourth thick section 11a21 is preferably not greater than the maximum thickness of the first thick section 11b1, and more preferably about 0.7 times or less the maximum thickness of the first thick section 11b1, for example.

The second tip section 12a2 includes a third thick section 12a21 that is thicker than the central section (second central section) of the second opposed section 12a in the length direction L. The third thick section 12a21 is opposed to the first thin section 11a1 with the ceramic layer 10g interposed therebetween in the thickness direction T. The maximum thickness of the third thick section 12a21 is preferably about 1.1 times to about 1.8 times, and preferably about 1.1 times to about 1.4 times, the thickness of the central section of the second opposed section 12a in the length direction L, for example. The maximum thickness of the third thick section 12a21 is preferably not greater than the maximum thickness of the second thick section 12b1, and more preferably about 0.7 times or less the maximum thickness of the second thick section 12b1, for example.

It is to be noted that while an example in which the internal electrodes are all preferably provided with thick sections and thin sections has been described in the present preferred embodiment, preferred embodiments of the present invention are not limited to this configuration. In preferred embodiments of the present invention, what is required is only that at least one internal electrode is provided with a thick section and a thin section. The thickness of each internal electrode can be measured, for example, in a cross section exposed in the length direction L and the thickness direction T in a central portion of the ceramic electronic component 1 in the width direction W.

A method for manufacturing the ceramic electronic component 1 is not particularly limited. The ceramic electronic component 1 can be manufactured, for example, in the following manner.

First, ceramic green sheets were prepared for forming the ceramic body 10. Next, a conductive paste layer for an internal electrode is formed on the ceramic green sheets. The ceramic green sheets with the conductive paste layers formed thereon and ceramic green sheets without any conductive paste layers formed thereon are stacked appropriately, and subjected to pressing to form a laminated body. Thereafter, the laminated body is subjected to degreasing and firing, thereby achieving the ceramic body 10 with the first and second internal electrodes 11 and 12 provided therein. The first and second external electrodes 13 and 14 may be formed by the formation of a conductive paste on a raw ceramic body, or formed by conductive paste coating or plating onto the fired ceramic body 10.

Further, the thin sections and the thick sections can be formed, for example, in the following manner. For example, in the case of forming the conductive paste layers by gravure printing, the thin sections and the thick sections can be formed such that a gravure plate for forming the conductive paste layers is provided with shallow concave sections for forming the thin section and deep concave sections for forming the thick sections.

For example, in the case of forming the conductive paste layers by screen printing, the thick sections and the thin sections can be formed by preparing more than one pattern, and performing printing more than once on top of each other using the patterns.

As described above, in the case of the ceramic electronic component 1, the first extraction section 11b is provided with the first thick section 11b1, whereas the base end section of the first opposed section 11a is provided with the first thin section 11a1. Thus, the thickness of the first internal electrode 11 suddenly changes between the first thick section 11b1 and the first thin section 11a1. The large difference in thickness, which is provided between the first thick section 11b1 and the first thin section 11a1 in the conductive paste layer of the first internal electrode 11, effectively prevents relative misalignment of the ceramic green sheet provided with the conductive paste layer for the second internal electrode 12. For this reason, the first and second internal electrodes 11 and 12 are arranged with high positional precision. Therefore, the performance of the ceramic electronic component 1 is improved.

In the case of the ceramic electronic component 1, the second extraction section 12b is provided with the second thick section 12b1, whereas the base end section of the second opposed section 12a is provided with the second thin section 12a1. For this reason, the first and second internal electrodes 11 and 12 are arranged with higher positional precision. Therefore, the performance of the ceramic electronic component 1 is further improved.

In addition, in the case of the ceramic electronic component 1, the second tip section 12a2 is provided with the third thick section 12a21. Thus, an anchor effect is produced to a greater degree. Therefore, the first and second internal electrodes 11 and 12 are arranged with significantly higher positional precision. Therefore, the performance of the ceramic electronic component 1 is further improved.

Furthermore, in the case of the ceramic electronic component 1, the first tip section 11a2 is provided with the fourth thick section 11a21. Thus, an anchor effect is produced to a significantly greater degree. Therefore, the first and second internal electrodes 11 and 12 are arranged with significantly higher positional precision. Therefore, the performance of the ceramic electronic component 1 is further improved.

In addition, the third thick section 12a21 is opposed to the first thin section 11a1, and the large difference in thickness is reduced between the region provided with both of the first and second internal electrodes 11 and 12 and the region provided with only one of the electrodes. Therefore, the internal electrodes 11 and 12 are less likely to be cracked or broken. In addition, the ceramic layer 10g is less likely to be peeled. As a result, excellent reliability is achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including first and second principal surfaces, first and second side surfaces, and first and second end surfaces;
a first internal electrode provided in the ceramic body and extending in a direction from the first end surface; and
a second internal electrode provided in the ceramic body so as to be opposed to the first internal electrode with a ceramic layer interposed therebetween, the second internal electrode extending in the direction from the second end surface; wherein
the first internal electrode comprises:
 a first opposed section opposed to the second internal electrode with the ceramic layer interposed therebetween; and
 a first extraction section not opposed to the second internal electrode with the ceramic layer interposed therebetween, the first extraction section being located closer to the first end surface than the first opposed section;

the first extraction section includes a first thick section thicker than a first central section of the first opposed section;
the first opposed section includes a first base end section opposed to a second tip section of the second internal electrode closer to the first end surface, with the ceramic layers interposed therebetween;
the first base end section includes a first thin section thinner than the first central section;
the second internal electrode comprises:
 a second opposed section opposed to the first internal electrode with the ceramic layer interposed therebetween; and
 a second extraction section not opposed to the first internal electrode with the ceramic layer interposed therebetween, the second extraction section being located closer to the second end surface than the second opposed section;
the second extraction section includes a second thick section thicker than a second central section of the second opposed section;
the second opposed section includes a second base end section opposed to a first tip section of the first internal electrode closer to the second end surface, with the ceramic layers interposed therebetween;
the second base end section includes a second thin section thinner than the second central section;
the second tip section includes a third thick section thicker than the second central section;
the third thick section is opposed to the first thin section with the ceramic layer interposed therebetween; and
a minimum thickness of the first thin section is about 0.6 times or more and about 0.95 times or less than a thickness of the first central section of the first opposed section.

2. The ceramic electronic component according to claim 1, wherein the first tip section includes a fourth thick section thicker than the first central section.

3. The ceramic electronic component according to claim 2, wherein the fourth thick section is opposed to the second thin section with the ceramic layer interposed therebetween.

4. The ceramic electronic component according to claim 1, further comprising:
a first external electrode provided on the first end surface, and connected to the first internal electrode; and
a second external electrode provided on the second end surface, and connected to the second internal electrode.

5. The ceramic electronic component according to claim 4, wherein the first internal electrode is also provided on portions of the first and second principal surfaces and portions of the first and second side surfaces.

6. The ceramic electronic component according to claim 4, wherein the second internal electrode is also provided on portions of the first and second principal surfaces and portions of the first and second side surfaces.

7. The ceramic electronic component according to claim 4, wherein the first and second external electrodes are made of at least one of Ni, Cu, Ag, Pd, Au, Pt, and Sn.

8. The ceramic electronic component according to claim 4, wherein each of the first and second external electrodes includes a laminated body including at least two conductive layers.

9. The ceramic electronic component according to claim 8, wherein each of the at least two conductive layers is made of at least one of Ni, Cu, Ag, Pd, Au, Pt, and Sn.

10. The ceramic electronic component according to claim 1, wherein the ceramic body has a substantially cuboid shape.

11. The ceramic electronic component according to claim 1, wherein the ceramic body includes at least one of $BaTiO_3$, $CaTiO_3$, $SrTiO_3$, and $CaZrO_3$ as a main component.

12. The ceramic electronic component according to claim 11, wherein the ceramic body includes at least one of a Mn compound, a Co compound, a rare-earth compound, and a Si compound as an additive.

13. The ceramic electronic component according to claim 1, wherein the first and second internal electrodes are made of at least one of Ni, Cu, Ag, Pd, Au, Pt, and Sn.

14. The ceramic electronic component according to claim 1, wherein the first thick section has a thickness in a range of about 1.2 to about 2.5 times a thickness of the first central section.

15. The ceramic electronic component according to claim 1, wherein the first thick section has a thickness in a range of about 1.5 to about 2.0 times a thickness of the first central section.

16. The ceramic electronic component according to claim 1, wherein the second thick section has a thickness in a range of about 1.2 to about 2.5 times a thickness of the second central section.

17. The ceramic electronic component according to claim 1, wherein the second thick section has a thickness in a range of about 1.5 to about 2.0 times a thickness of the second central section.

* * * * *